United States Patent
Oh

(10) Patent No.: US 9,577,693 B2
(45) Date of Patent: Feb. 21, 2017

(54) BLUETOOTH HEADSET AND WRISTWATCH INCLUDING THE SAME

(71) Applicant: Young Gwun Oh, Pyeongtaek (KR)

(72) Inventor: Young Gwun Oh, Pyeongtaek (KR)

(73) Assignee: Young Gwun OH, Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 15/157,363

(22) Filed: May 17, 2016

(65) Prior Publication Data

US 2016/0344436 A1 Nov. 24, 2016

(30) Foreign Application Priority Data

May 19, 2015 (KR) .................. 10-2015-0069640
Dec. 17, 2015 (KR) .................. 10-2015-0181132

(51) Int. Cl.
*H04W 4/00* (2009.01)
*H04B 1/3827* (2015.01)
*G04G 21/04* (2013.01)
*H04W 84/20* (2009.01)

(52) U.S. Cl.
CPC .............. *H04B 1/385* (2013.01); *G04G 21/04* (2013.01); *H04W 4/008* (2013.01); *H04B 2001/3861* (2013.01); *H04B 2001/3866* (2013.01); *H04W 84/20* (2013.01)

(58) Field of Classification Search
CPC ......... H04B 1/38; H04B 1/385; H04B 1/3827; H04B 1/3833; H04B 2001/3861; H04B 2001/3872; G04G 21/04; G04G 21/06; G04G 21/08; H04W 4/006; H04W 4/008; H04W 4/02; H04M 1/00; H04M 1/04; G06F 1/163; G06F 3/1454; G06F 3/1462

See application file for complete search history.

(56) References Cited

U.S. PATENT DOCUMENTS

| 6,757,390 | B2 * | 6/2004 | Ito ..................... | H04B 1/385 |
| | | | | 379/433.02 |
| 7,529,155 | B2 * | 5/2009 | Fasciano ........... | H04B 1/385 |
| | | | | 368/10 |
| 2016/0252980 | A1 * | 9/2016 | Park ................... | G06F 1/163 |

FOREIGN PATENT DOCUMENTS

| JP | 11-044775 A | 2/1999 |
| JP | 2005-191766 A | 7/2005 |
| JP | 2005-191767 A | 7/2005 |
| KR | 10-2003-0042126 A | 5/2003 |
| KR | 10-0642310 B1 | 10/2006 |

(Continued)

OTHER PUBLICATIONS

Korean Office Action for corresponding Korean Patent Application No. 10-2015-0181132 issued on Apr. 14, 2016, citing the above reference(s).

*Primary Examiner* — Thanh Le
(74) *Attorney, Agent, or Firm* — Hauptman Ham, LLP

(57) ABSTRACT

A wristwatch includes a watch body having a display part on an upper surface thereof and having a seating part at an outline part of the display part, and a Bluetooth headset including a sound output unit that outputs sound information received from a master terminal, having a shape corresponding to an outline part of the display part to surround the display part, seated in the seating part, and installed to be attached to and detached from the watch body, the Bluetooth headset being a slaver terminal of the master terminal that functions as a body case or a bezel of the watch body.

4 Claims, 18 Drawing Sheets

(56) References Cited

FOREIGN PATENT DOCUMENTS

| | | |
|---|---|---|
| KR | 10-2007-0094618 A | 9/2007 |
| KR | 10-2010-0096397 A | 9/2010 |

* cited by examiner

BLUETOOTH HEADSET AND WRISTWATCH INCLUDING THE SAME

CROSS-REFERENCE TO RELATED APPLICATIONS

A claim for priority under 35 U.S.C. §119 is made to Korean Patent Applications No. 10-2015-0069640 filed May 19, 2015 and No. 10-2015-0181132 filed Dec. 17, 2015, in the Korean Intellectual Property Office, the entire contents of which are hereby incorporated by reference.

BACKGROUND

The inventive concept relates to a Bluetooth headset that is an auxiliary communication terminal and a wristwatch including the same, and more particularly, to a wireless communication headset assembly using a bezel defining an outline part of a wristwatch and a wristwatch on which the headset assembly is mounted.

The inventive concept relates to a Bluetooth headset that is an auxiliary terminal of a terminal having a Bluetooth function.

The Bluetooth communication technology as a representative short range mobile wireless communication system corresponds to an apparatus and a method for mutually transmitting data to various devices, such as a smartphone, a notebook, an MP3 player, and a printer, which are located in a short range of about 10 meters in real time through a wireless link, and is widely used in various devices because it consumes low power, is manufactured in the form of a small-scale microchip, and is inexpensive.

The device employing the Bluetooth system includes a master terminal that transmits data, and a plurality of slave terminals that receives data. Currently, a representative master terminal is a smartphone or a notebook, and a representative slave terminal is a headset or a hands-free device, or a mouse.

In particular, the headset, which is most eminent, is convenient because a communication can be simply made during a voice communication through the headset by using a Bluetooth link without directly taking out the mobile phone and a simple voice communication or text message can be sent without directly using the mobile phone due to the development of voice recognition of the present age.

However, the Bluetooth headset also has a disadvantage of being carried separately from a master terminal, and may be lost or damaged while being carried. Further, if the Bluetooth headset is put on by the user even when it is not necessary, it makes the user's boy inconvenient and gives the body of the user a burden so that is may not be used any more.

Furthermore, the inventive concept relates to a wristwatch, and in particular, relates to a smartwatch. The wristwatch is a small-sized watch that is mounted on a wrist to be used, and includes a watch body including a display part that displays time and a body case that surrounds the display part, and a bracelet that fixes the watch body to the wrist. Further, a bezel that surrounds an outline part of the display part is often provided as a design element.

However, according to the existing wristwatch, because the watch itself should be purchase to change the design element, costs are expensive, and because the wristwatch is always attached to a hand of the user, the body case of the watch body is easily scratched, spoiling the external appearance of the wristwatch, if the user is moved carelessly. In particular, in a wearable electronic device such as a smartwatch, because internal components may be damaged by an external impact, the wearable electronic device should be carefully handled.

SUMMARY

The inventive concept has been made in an effort to solve the above-mentioned problems, and provides a Bluetooth headset that improves the portability and in-use convenience of the Bluetooth headset, and provides a comfortable mounting feeling, and makes the watch appealing with a high-end design. In particular, while the conventional technology fails to consider the appealing external appearance, the weight, the in-use convenience such as recognition of a display due to a limit in size and the attachment method in designing a wristwatch, the inventive concept provides a Bluetooth headset that has improved in-use convenience and portability while maintaining the appealing feeling of a classic wristwatch by using a Bluetooth headset based on a bezel that is a basic element of the classic wristwatch.

The inventive concept also provides a wristwatch that includes the Bluetooth to protect an external appearance thereof from a surrounding environment and realize various designs with one wristwatch.

Accordingly, the Bluetooth headset of the inventive concept can improve the portability and in-use convenience thereof as compared with the existing Bluetooth headsets, can reduce a danger of loss and damage, and make the wristwatch appealing.

The inventive concept has been made in an effort to solve the aforementioned problems, and provides a Bluetooth headset and a wristwatch including the same.

In accordance with an aspect of the inventive step, there is provided a wristwatch including a watch body having a display part on an upper surface thereof and having a seating part at an outline part of the display part, and a Bluetooth headset including a sound output unit that outputs sound information received from a master terminal, having a shape corresponding to an outline part of the display part to surround the display part, seated in the seating part, and installed to be attached to and detached from the watch body, the Bluetooth headset being a slaver terminal of the master terminal that functions as a body case or a bezel of the watch body.

In another embodiment, the seating part of the watch body may have a shape corresponding to a bottom surface or an inner surface of the Bluetooth headset.

In another embodiment, the Bluetooth headset may include an earring tip that constitutes at least a portion of an upper surface, an inner surface, an outer surface, or a rear surface of a housing of the Bluetooth headset, the earring tip being separable from the housing of the Bluetooth headset to be rotated.

In another embodiment, the Bluetooth headset may be installed to be attached to and detached from the watch body through hook coupling or screw coupling.

In another embodiment, the Bluetooth headset may include one or more joint parts and the joint parts are moved while links constituting the joint part form an angle.

In another embodiment, the Bluetooth headset may surround only a portion of the display part, and may be installed in the watch body to be attached and detached vertically and horizontally.

In another embodiment, the Bluetooth headset may be installed to be attached to and detached from the watch body by using a stopping recess and a stopping protrusion corresponding to the stopping recess.

In another embodiment, outer coupling steps may protrude from an outer surface of the watch body and inner coupling step may protrude from an inner surface of the Bluetooth headset at alternate locations of the locations of the inner coupling steps such that the Bluetooth headset is installed to be attached to and detached from the watch body by fastening the outer coupling steps and the inner coupling steps.

In another embodiment, the Bluetooth headset may include a detachment detecting sensor that detects detachment of the Bluetooth headset from the watch body to perform an on/off function of the Bluetooth headset, and a sleep detecting sensor that detects a state in which the Bluetooth headset is separated from the watch body and is not used to perform an off function.

In another embodiment, the wristwatch may include a battery and a charging terminal such that electric power is charged in the Bluetooth headset if the Bluetooth headset is seated in the wristwatch, and the Bluetooth headset may include a charging module that interworks with the wristwatch such that the Bluetooth headset is charged by electric power of the wristwatch when the Bluetooth headset is coupled to the wristwatch.

In another embodiment, the Bluetooth headset further includes a housing that is separated into a plurality of parts, and the plurality of parts of the housing approaches each other or are spaced apart from each other through a coupler.

According to an embodiment of the inventive concept, the inconvenience of carrying a Bluetooth headset separately from a master device can be solved by using a basic element of a wristwatch worn by the user normally, while the appealing feeling of the wristwatch is maintained, and a danger of loss and damage can be reduced due to the convenient portability.

The effects of the inventive concept can be achieved by the configurations of the inventive concept irrespective of whether or not they are recognized by the inventor(s). Therefore, the aforementioned effects are merely examples and should not be construed that the inventor(s) describes all effect recognized by the inventor(s) or actually present. The effects of the inventive concept should be additionally recognized by the overall description of the specification, and the effects that are admitted by those skilled in the art throughout the specification also within the range of the effects of the inventive concept.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
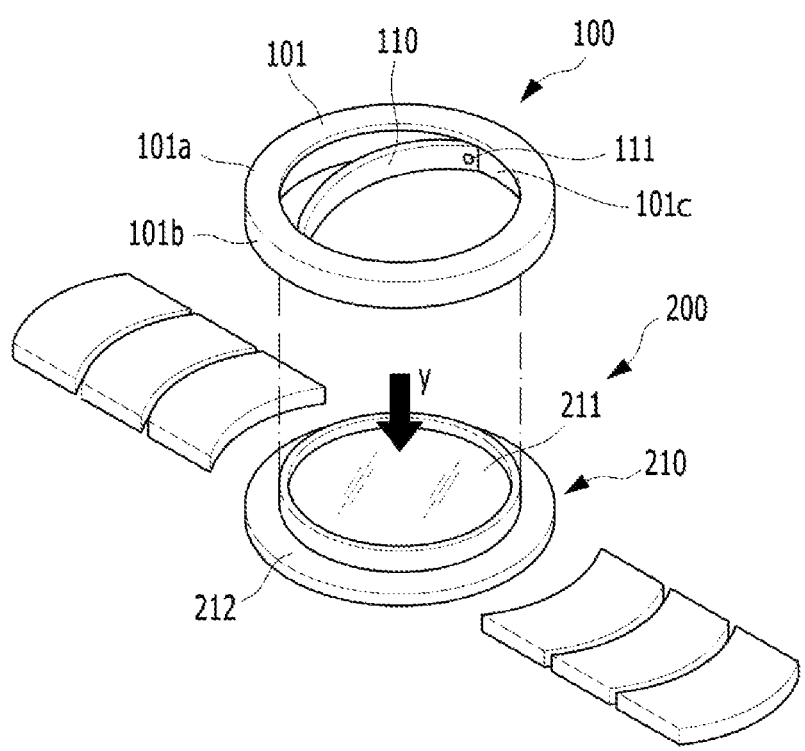
FIGS. 1 and 2 are perspective views illustrating a Bluetooth headset 100 and a wristwatch 200 according to an embodiment of the inventive concept.

Prior to the description of the inventive concept, it will be noted that the terms and wordings used in the specification and the claims should not be construed as general and lexical meanings, but should be construed as the meanings and concepts that agree with the technical spirits of the inventive concept, based on the principle stating that the concepts of the terms may be properly defined by the inventor(s) to describe the invention in the best manner.

Therefore, because the examples described in the specification and the configurations illustrated in the drawings are merely for the preferred embodiments of the inventive concept but cannot represent all the technical spirits of the inventive concept, it should be understood that various equivalents and modifications that may replace them can be present.

Hereinafter, the inventive concept will be described in more detail with reference to the drawings. The terms "sensor", "module" and "unit" for the elements are given or used in combination to easily write the specification, and do not have distinguished meanings or functions.

Figure 2:
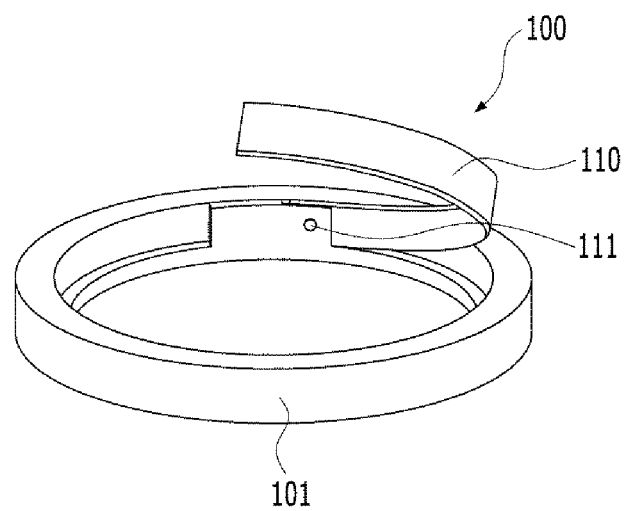
Figure 3:
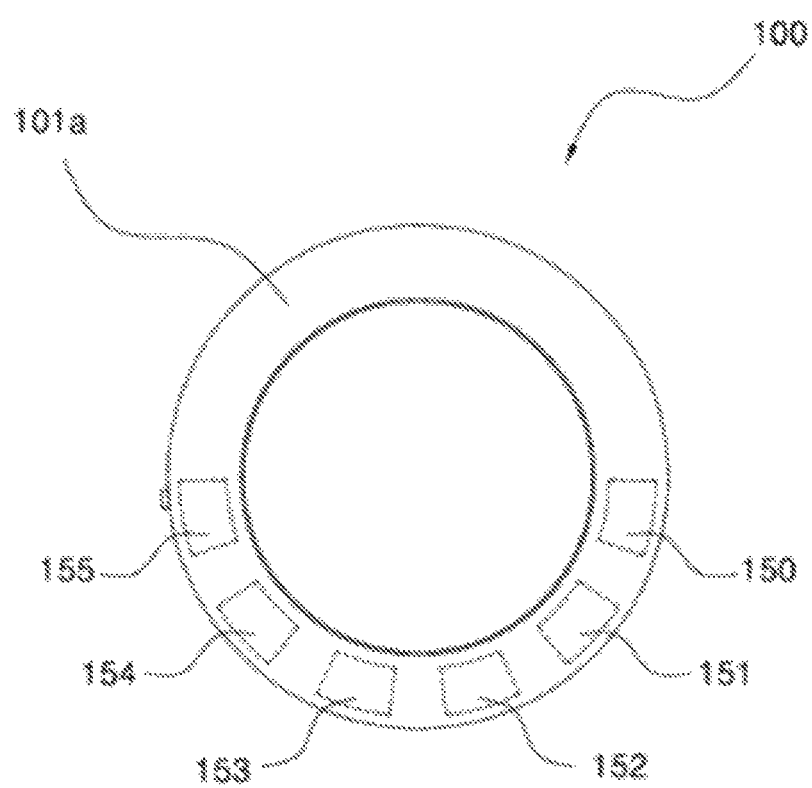
FIG. 3 is a front view illustrating an internal configuration of the Bluetooth headset 100 of FIG. 1 according to an embodiment of the inventive concept.

FIGS. 1 and 2 are perspective views illustrating a Bluetooth headset 100 and a wristwatch 200 according to an embodiment of the inventive concept. FIG. 3 is a front view illustrating an internal configuration of the Bluetooth headset 100 of FIG. 1 according to an embodiment of the inventive concept.

Referring to FIGS. 1 and 2, the inventive concept relates to the Bluetooth headset 100 that is a slave terminal of a master terminal having a Bluetooth function, and the Bluetooth headset 100 may be installed to be attached to and detached from the wristwatch 200.

The wristwatch 200 includes a watch body 210 that is a central element of the watch, and a display part 211 is formed on an upper surface of the watch body 210 and a seating part 212 is formed at an outline part of the watch body 210. The display part 211 is an element that indicates time or by which a usage state of the inventive concept is identified and may include an analog watch dial or a digital liquid crystal screen, and when the display part 211 is constituted by a touch screen, functions as an input unit.

The seating part 212 which has a shape corresponding to the outline part of the display part 211 and surrounds the display part 211 and in which the Bluetooth headset 100 is seated is formed at the outline part of the display part 211. The seating part 212 is an element configured such that the Bluetooth headset 100 is mounted on the watch body 210 and supported by the seating part 212, and because the seating part 212 is a surface in contact with the Bluetooth headset 100, it generally has a shape corresponding to the bottom surface of the Bluetooth headset 100.

Although FIG. 1 illustrates that the seating part 212 in which the Bluetooth headset 100 is proximate to the display part 211, the seating part 212 may be spaced apart from the display part 211 by an interval. For example, the seating part 212 may be formed on a side surface of the watch body 210.

The Bluetooth headset 100 according to an embodiment of the inventive concept may surround the entire outline part of the display part 211. In this case, the Bluetooth headset 100 may be attached and detached in the Y direction (the vertical direction) of FIG. 1.

An earring tip 110 is formed on an inner surface 101c of a housing 101 of the Bluetooth headset 100. The earring tip 110 has an arc shape, and may constitute at least a portion of the inner surface 101c of the housing 101. According to an embodiment, the earring tip 110 may have a semicircular arc shape or an arc shape, the central angle of which is smaller or larger than that of the semicircular arc shape. Here, the configuration that the earring tip 110 constitutes at least a portion of the inner surface 101c of the housing 101 means that the inner surface 101c of the housing 101 and the inner surface of the earring tip 110 are located on the same plane before the earring tip 110 is separated. One or opposite ends of the earring tip 110 may be coupled to the housing 101 to be rotatable about a rotational pin 111. The earring tip 110 is separated through manipulation of a button (not illustrated) or the like, and is rotated about the rotational pin 111. The Bluetooth headset 100 may be mounted on an ear of the user by using the earring tip 110. Although FIGS. 1 and 2 illustrate that the earring tip 110 constitutes at least a portion of the inner surface 101c of the housing 101, the earring tip 110 according to an embodiment may constitute at least a portion of an outer surface 101b, an upper surface, or a rear surface of the housing 101 in consideration of the user having large ears or wearing eyeglasses.

The wristwatch 200 has a battery to charge electric power of the Bluetooth headset 100 if the Bluetooth headset 100 is seated in the seating part 212, and has a charging terminal (not illustrated) at a portion of the watch body 210 such that the battery receives electric power from the outside. The Bluetooth headset 100 includes a charging module that interworks with the wristwatch 200 to charge the Bluetooth headset 100 with the electric power of the wristwatch 200 when the Bluetooth headset 100 is coupled to the wristwatch 200. The charging module may be of an electrical contact type or a magnetically induced wireless charging type, but the inventive concept is not limited thereto.

Referring to FIG. 3, the Bluetooth headset 100 is configured such that a sound output unit 150 that outputs sound information received from the master terminal of the Bluetooth headset 100 is located in the vicinity of a tragus of the user. The sound output unit 150 may not be a speaker but a bone conduction type using vibrations, but the inventive concept is not limited thereto.

A detachment detecting sensor 153 that detects detachment of the Bluetooth headset 100 from the watch body 210 to automatically perform an on/off function of the Bluetooth headset 100 and a sleep detecting sensor 154 may be further provided in the interior of the Bluetooth headset 100. This can reduce power consumption by automatically recognizing a state in which the Bluetooth headset 100 is not used, and can improve the convenience of the user by reducing the classifications of necessary operations. The forms of the detachment detecting sensor 153 and the sleep detecting sensor 154 are not limited physically and functionally, and in an embodiment, for a Bluetooth headset of a smartwatch, the smartwatch calls the Bluetooth headset to switch on the function of the Bluetooth headset if the smartwatch is ringed, and the Bluetooth headset that receives a communication call terminating signal from the smartwatch is converted into a sleep mode if the voice communication ends. As another example, if the coupling of the Bluetooth headset 100 and the wristwatch 200 is released and the charging module of the Bluetooth headset 100 does not receive electric power from the battery of the wristwatch 200, the sleep mode may be released and the function may be switched on as the Bluetooth headset 100 receives a signal regarding the fact from the wristwatch 200 or detects the situation.

The detachment detecting sensor 153 and the sleep detecting sensor 154, which have been described above, are located at a site at which the user feels comfortable due to weight balance while wearing the Bluetooth headset 100, in correspondence to the sound output unit 150 provided in the vicinity of the tragus of the user.

In addition, the inventive concept may further include a data input unit 151 that receives an audio signal and a data converting unit 152, so that the Bluetooth headset is used as a hearing aid by themselves or is used as a hearing aid by using an input unit and a hearing aid application of the smartphone. The data input unit 151 not only receives an audio signal but also may include one or more input units such as a camera, a microphone, and an operation detecting sensor. For the Bluetooth headset 100 having both a camera and a microphone, image data and sound data that are input may be delivered to the master terminal through a short range communication and be stored.

Similarly, the sensors of the Bluetooth headset 100 are not limited to the detachment detecting sensor 153 and the sleep detecting sensor 154, and may include one or more sensors for acquiring information on the user or information on environments that surround the headset. For example, the sensors of the Bluetooth headset 100 may include one or more of a proximity sensor, an illumination sensor, an acceleration sensor, a magnetic sensor, a G-sensor, a gyroscope sensor, a motion sensor, an RGB sensor, an infrared (IR) sensor, an ultrasonic sensor, an optical sensor, a microphone, a battery gauge, an environment sensor (for example, a barometer, a hygrometer, a thermometer, a radial dosimeter, a heat detecting sensor, or a gas detecting sensor), and a chemical sensor (for example, an electronic nose, a healthcare sensor, or a biometric sensor), but the inventive concept is not limited thereto. Meanwhile, information elements detected two or more of the sensors may be combined to be utilized, and of course, the information elements may be transmitted to a master device such as a smartphone or a smartwatch.

Figure 4:
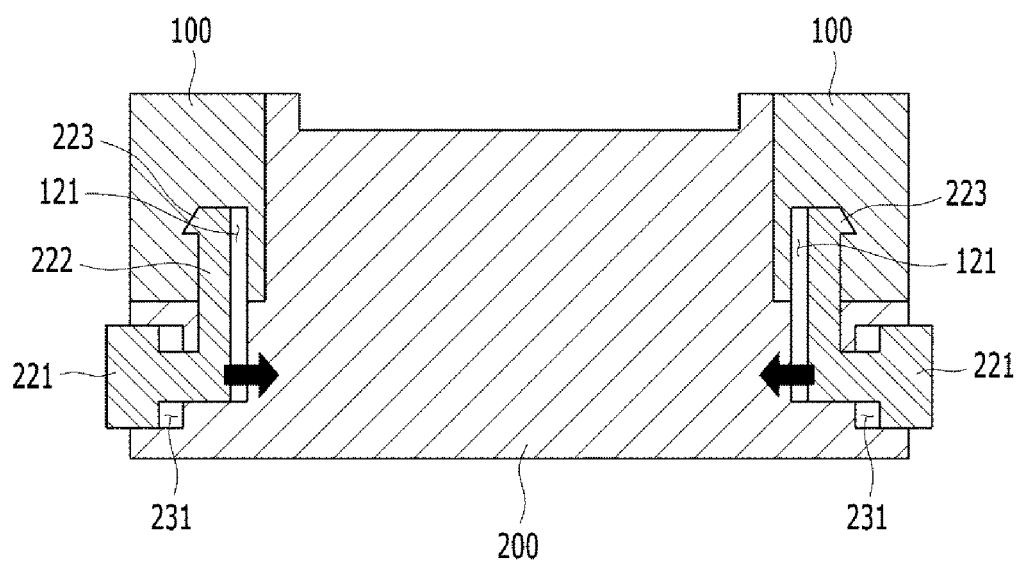
FIGS. 4 and 5 are sectional views of a coupling part illustrating coupling of the Bluetooth headset 100 and the wristwatch 200 according to an embodiment of the inventive concept.
Figure 5:
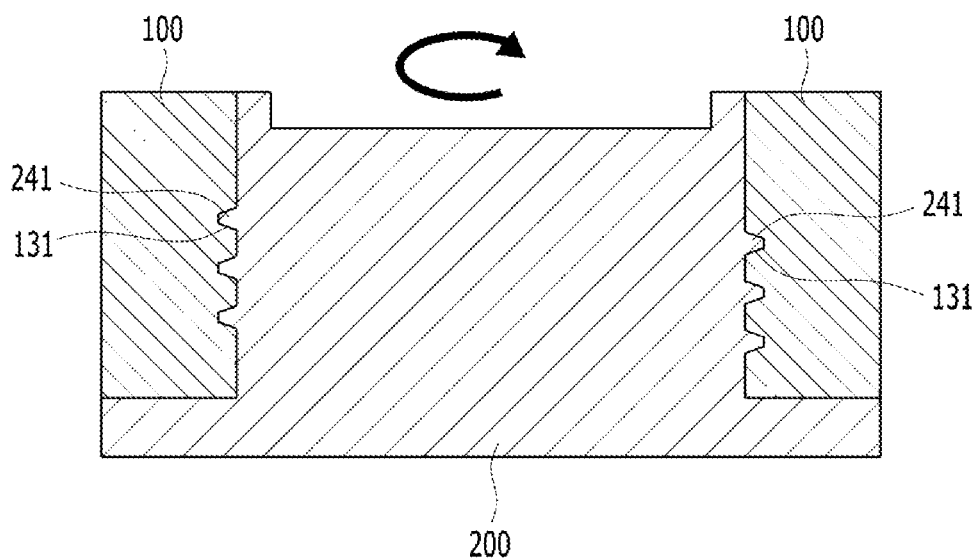

FIGS. 4 and 5 are sectional views of a coupling part illustrating coupling of the Bluetooth headset 100 and the wristwatch 200 according to an embodiment of the inventive concept. Hereinafter, a method of coupling the Bluetooth headset 100 to the watch body 210 according to an embodiment of the inventive concept illustrated in FIG. 1 will be described with reference to the drawings.

The Bluetooth headset 100 of the inventive concept includes one or more locking units that perform a function of attaching and detaching the Bluetooth headset 100 to and from the watch body, and it is preferable that two or more locking units firmly couple the Bluetooth headset 100.

Referring to FIG. 4, the Bluetooth headset 100 may be hook-coupled to the wristwatch 200. To achieve this, a hook accommodating recess 121 may be formed in the interior of the housing 101 of the Bluetooth headset 100, and a hook 222 having a hook stopper 223 may be formed in the interior of the watch body 210. Further, an unlocking button 221 is formed on an outer surface of the watch body 210 to help release the coupling of the Bluetooth headset 100 and the watch body 210. The unlocking button 221 extends from the hook 222, and if the unlocking button 221 is pushed, the Bluetooth headset 100 and the wristwatch 200 may be separated from each other as the hook 222 is moved back into the watch body 210 while the unlocking button 221 is moved back into the button accommodating recess 231. Although FIG. 4 illustrates that the unlocking button 221 and the hook 222 are formed in the watch body 210, the unlocking button 221 and the hook 222 may be formed in the Bluetooth headset 100.

Referring to FIG. 5, the Bluetooth headset 100 may be screw-coupled to the wristwatch 200. To achieve this, a female thread 131 may be formed on an inner surface of the housing 101 of the Bluetooth headset 100, and a male thread 241 may be formed on an outer surface of the watch body 210. The Bluetooth headset 100 may be coupled to the watch body 210 by rotating the housing 101 of the Bluetooth headset 100 about the watch body 210.

Through this coupling method, the Bluetooth headset 100 may be conveniently attached and detached even though the housing 101 defining the external appearance of the Bluetooth headset 100 is formed of a metallic material.

Further, the housing 101 defining the external appearance of the Bluetooth headset 100 may be formed of a resilient material such as rubber, urethane, silicon, or TPU such that the Bluetooth headset 100 itself is flexibly inserted into the watch body 210.

The inventive concept relates to a wristwatch 200 including the aforementioned Bluetooth headset 100. In the inventive concept, the aforementioned Bluetooth headset 100 may be installed to be attached to and detached from the watch body 210 to function as a body case or a bezel of the watch body 210. The inventive concept is particularly effective in a wristwatch type wearable electronic device such as a smartwatch. The wristwatch 200 and the Bluetooth headset 100 according to the inventive concept have features in the mutual coupling relationship, and in an interworking system when the wristwatch 200 is a smartwatch.

Further, the Bluetooth headset 100 of the inventive concept includes a specific number of joint parts so that it may be deformed into a form that is conveniently mounted on an ear of the user when the Bluetooth headset 100 is separated from the watch body 210, and details thereof will be described with reference to the wristwatch 400 including the Bluetooth headset 300, which will be described immediately below.

Figure 6:
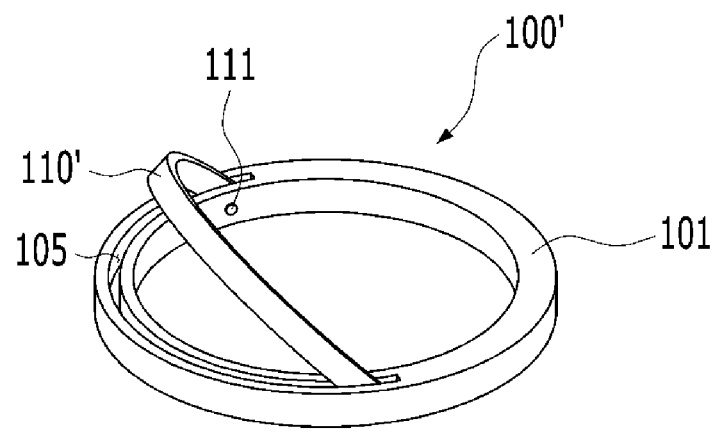
FIG. 6 is a perspective view illustrating a Bluetooth headset 100' according to an embodiment of the inventive concept coupled to the wristwatch 200 of FIG. 1.

FIG. 6 is a perspective view illustrating a Bluetooth headset 100' according to an embodiment of the inventive concept coupled to the wristwatch 200 of FIG. 1.

Figure 7:
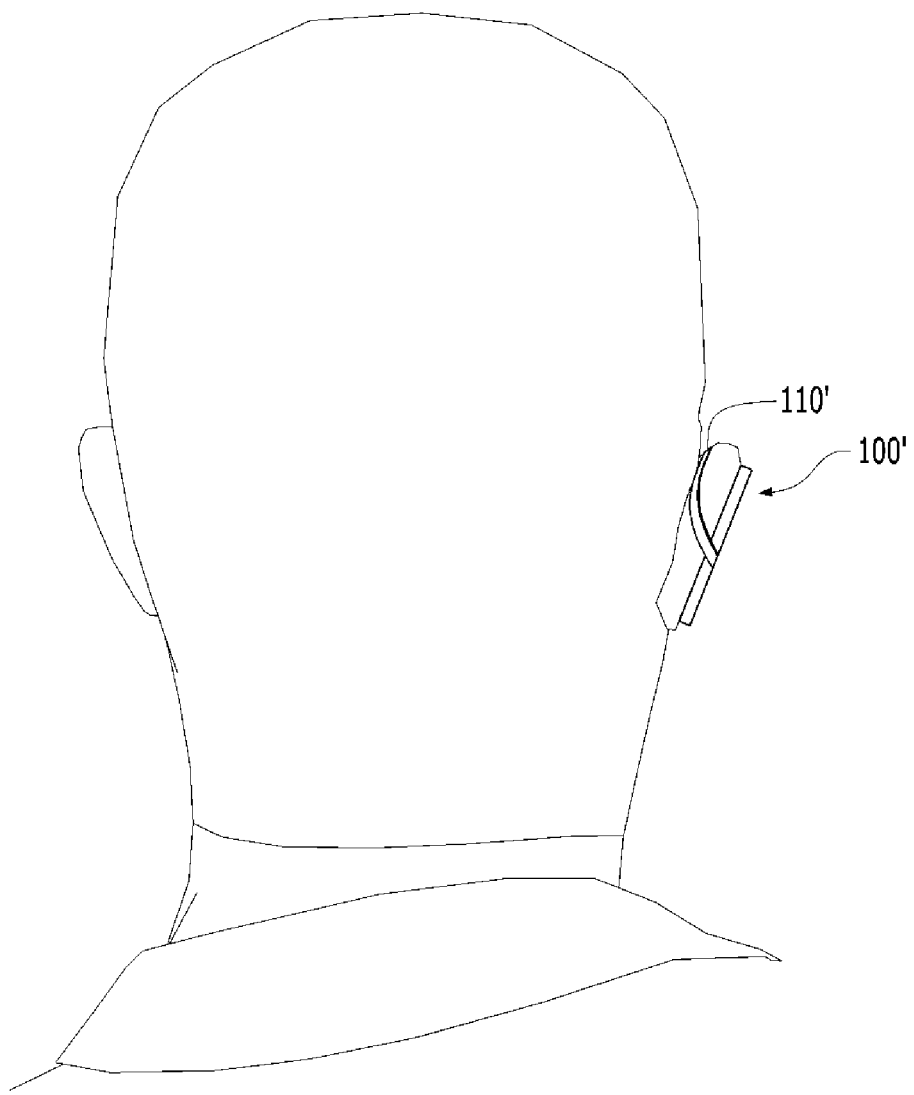
FIG. 7 is a view illustrating an in-use state in which the Bluetooth headset 100' is mounted on an ear of the user according to the embodiment of FIG. 6.

FIG. 7 is a view illustrating an in-use state in which the Bluetooth headset 100' is mounted on an ear of the user according to the embodiment of FIG. 6. It can be seen in FIG. 7 how the Bluetooth headset 100' according to the embodiment of the inventive concept is applied.

Referring to FIGS. 6 and 7, a semicircular arc shaped earring tip 110' is formed on a rear surface of the housing 101 of the Bluetooth headset 100' between the inner surface and the outer surface of the housing 101 according to the second embodiment of the inventive concept. According to an embodiment, the earring tip 110' may have a shape, the central angle of which is smaller or larger than that of the semicircular arc. Opposite ends of the earring tip 110 are coupled to the housing 101 to be rotatable about a rotational pin 111. A recess 105 is formed on the rear surface of the housing 101 such that the earring tip 110' is accommodated in the recess 105. The earring tip 110 is withdrawn from the recess 105 through manipulation of a button (not illustrated) or the like, and is rotated about the rotational pin 111. The Bluetooth headset 100' may be mounted on an ear of the user by using the earring tip 110'. According to an embodiment, the earring tip 110' may be formed on the upper surface of the housing 101.

Figure 8:
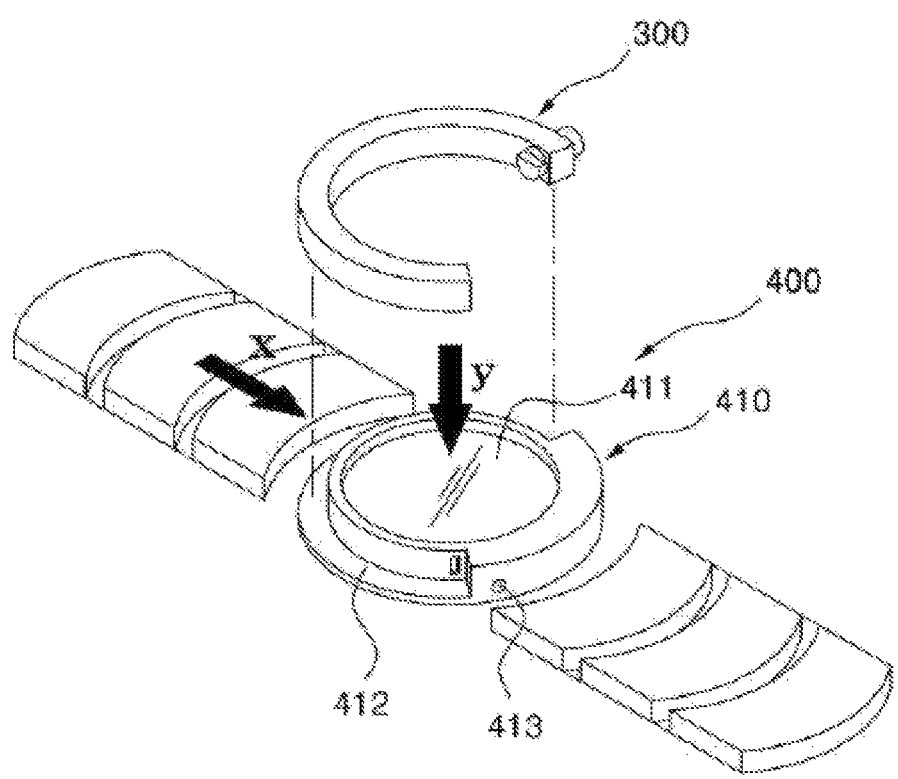
FIG. 8 is an exploded perspective view illustrating a Bluetooth headset 300 according to an embodiment of the inventive concept and a wristwatch 400 including the Bluetooth headset 300.

FIG. 8 is a perspective view illustrating a Bluetooth headset 300 according to an embodiment of the inventive concept and a wristwatch 400 including the Bluetooth headset 300. For convenience of description, a difference from the Bluetooth headset 100 and the wristwatch 200 described with reference to FIG. 1 will be mainly described in the following.

Referring to FIG. 8, a seating part 412 which has a shape corresponding to an outline part of a display part 411 formed on an upper surface of a watch body 410 and surrounds the display part 411 and in which the Bluetooth headset 300 is seated is formed at the outline part of the display part 411.

The Bluetooth headset 300 according to an embodiment of the inventive concept may surround only a portion of an outline part of the display part 411. In this case, a space for installing more functional elements may be further formed in the watch body 410 of the wristwatch 400. Further, there are various manners of attaching and detaching the Bluetooth headset 300, and as an embodiment, the Bluetooth headset 300 may be not only attached and detached in the Y direction (vertical direction) but also may be inserted in the X direction (horizontal direction).

Further, the wristwatch 400 includes a charging terminal 413 at a part at which the seating part 412 of the watch body 410 is not formed such that electric power is supplied from the outside to the wristwatch 400.

The Bluetooth headset 300 according to the embodiment may include one or more joint parts 310 for deforming the Bluetooth headset 300 into a form that is conveniently mounted on an ear of the user.

Figure 9:
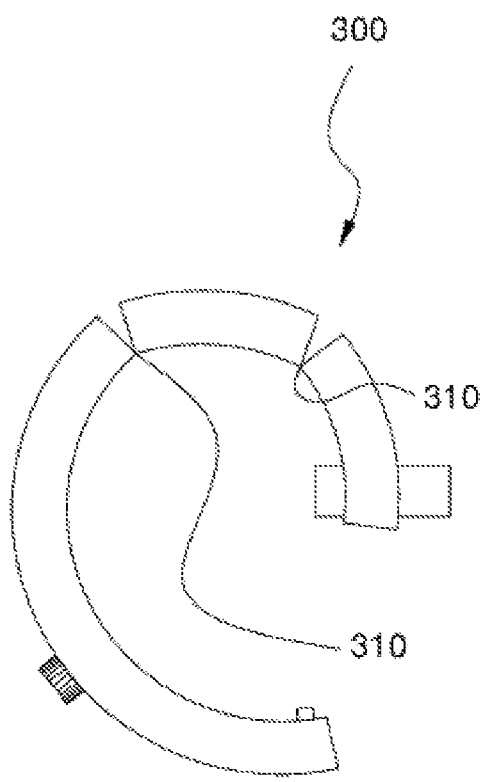
FIG. 9 is a front view illustrating a joint part 310 of the Bluetooth headset 300 of FIG. 8 according to an embodiment of the inventive concept.
Figure 10:
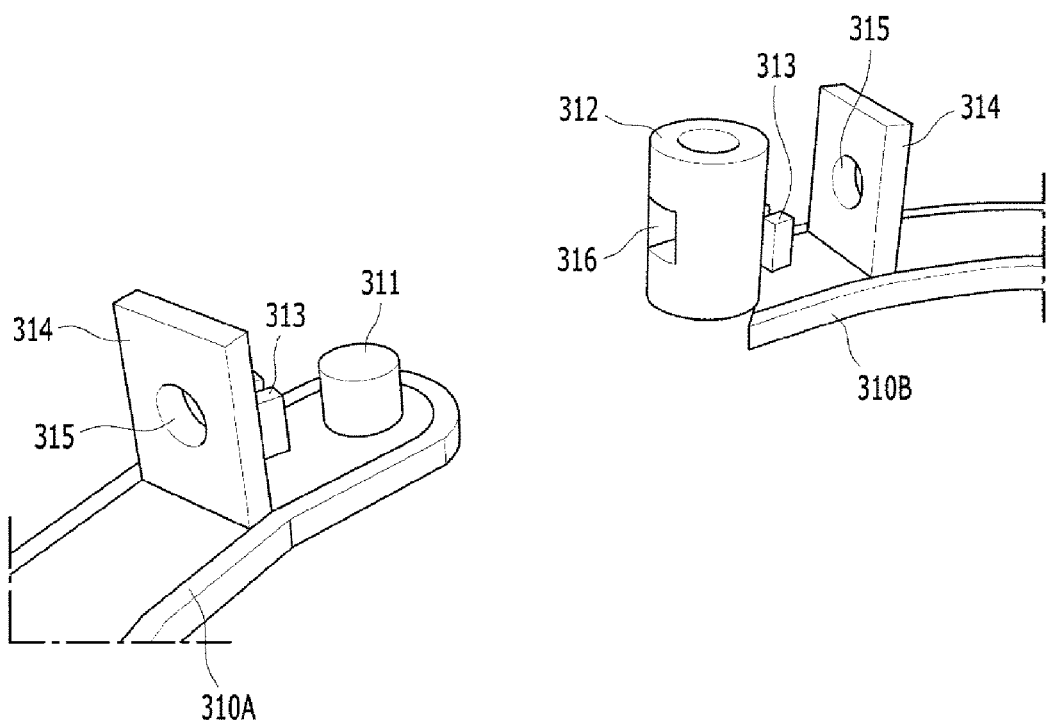
FIG. 10 is a perspective view illustrating an internal configuration of the joint part 310 of FIG. 9.

FIG. 9 is a front view illustrating a joint part 310 of the Bluetooth headset 300 of FIG. 8 according to an embodiment of the inventive concept. FIG. 10 is a perspective view illustrating an internal configuration of the joint part 310 of FIG. 9.

Referring to FIG. 9, one or more joint parts 310 may be provided in the Bluetooth headset 300. When the joint parts 310 are separated from the watch body 410 by using a shape memory material, they may be deformed in an automatically memorized shape to be conveniently mounted on an ear of the user.

Referring to FIG. 10, a joint part 310 is formed by coupling a plurality of links 310A and 310B. A stopping protrusion 311 may be formed in one link 310A, and a stopping recess 312 may be formed in the other link 310B. The plurality of links 310A and 310B constituting the joint part 310 may be moved with respect to each other while forming an angle. A space 316 for disposing a torsion spring (not illustrated) is formed in the stopping recess 312, and a seating recess 313, in which an arm of the torsion spring is seated, is formed in each of the links 310A and 310B. A partition wall 314 for separating the joint part 310 from another space is formed on the outside of the seating recess 313 for the purpose of waterproof. A through-recess 315, through which a wire passes, is formed in the partition wall 314.

Figure 11:
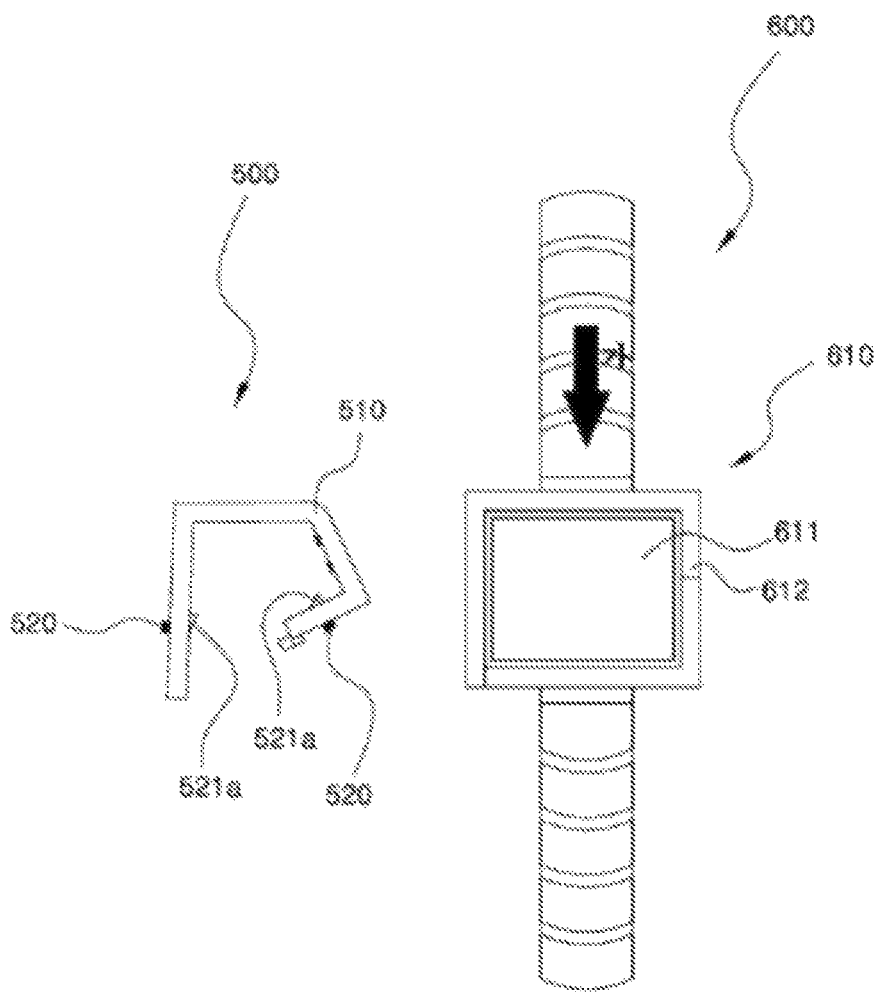
FIG. 11 is a front view illustrating a Bluetooth headset 500 and a wristwatch 600, in which a watch body 610 has a tetragonal shape, according to an embodiment of the inventive concept.
Figure 12:
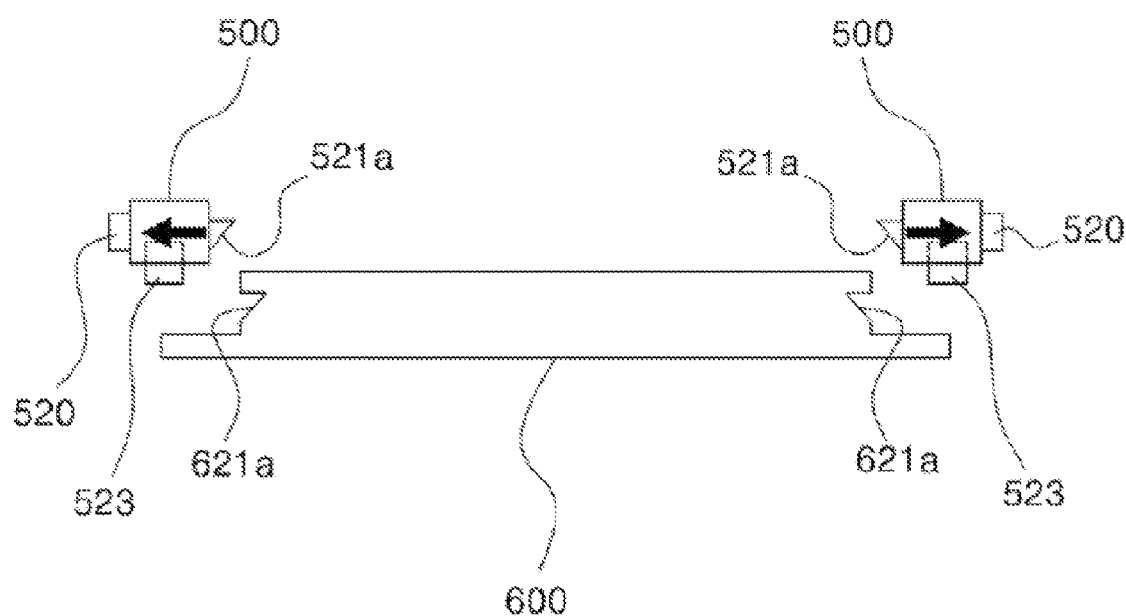
FIG. 12 are sectional views of a coupling part illustrating coupling of the Bluetooth headset 500 and the wristwatch 600 of FIG. 11 according to the embodiment of the inventive concept.

FIG. 11 is a front view illustrating a Bluetooth headset 500 and a wristwatch 600, in which a watch body 610 has a tetragonal shape, according to an embodiment of the inventive concept. FIG. 12 are sectional views of a coupling part illustrating coupling of the Bluetooth headset 500 and the wristwatch 600 of FIG. 11 according to the embodiment of the inventive concept. For convenience of description, a difference from the Bluetooth headset 300 and the wristwatch 400 described with reference to FIG. 8 will be mainly described in the following.

Referring to FIGS. 11 and 12, one or more locking units includes a stopping recess 621a formed at an outline part of a display part 611 and a stopping protrusion 521a formed in the Bluetooth headset 500 to correspond to the stopping recess 621a, and a stopping protrusion, to perform a function of attaching and detaching the Bluetooth headset 500 to and from the watch body 610 may be formed at the outline part of the display part 611 and a stopping recess may be formed in the Bluetooth headset 500, differently from the configuration of FIGS. 11 and 12.

The aforementioned locking unit may include an unlocking button 520 formed on an outer surface of the Bluetooth headset 500 to unlock the stopping protrusion 521a as a means for helping release the coupling of the watch body 610 and the Bluetooth headset 500, and if the unlocking button 520 is pushed, the stopping protrusion 521a is moved back into the Bluetooth headset 500 so that the Bluetooth headset 500 is separated from the watch body 610.

Further, the locking unit may further include a protruding spring 523 formed on one surface of the Bluetooth headset 500 in contact with a seating part 612 to help separate the Bluetooth headset as the protruding spring 523 protrudes if the unlocking button 520 is pushed.

Because the coupling unit according to the embodiment of the inventive concept does not exclude another coupling unit, an example of another coupling method will be described below.

Figure 13:
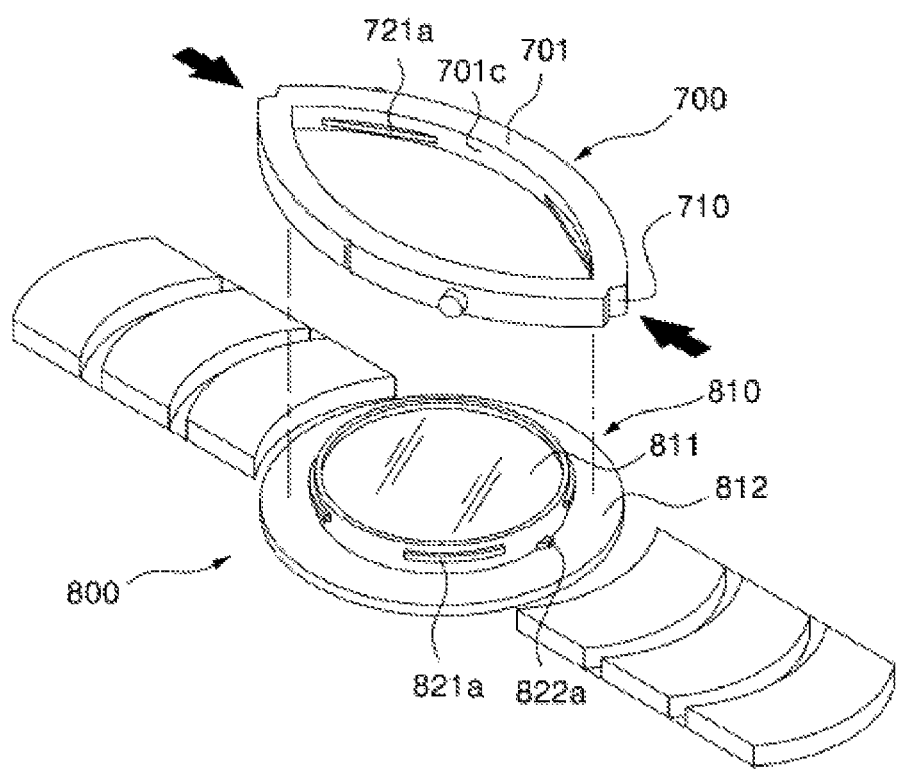
FIG. 13 is an exploded perspective view illustrating a Bluetooth headset 700 and a wristwatch 800 according to an embodiment of the inventive concept, in which an entire housing 701 of the Bluetooth headset 700 forms an outline part of a display part 811 of the wristwatch.
Figure 14:
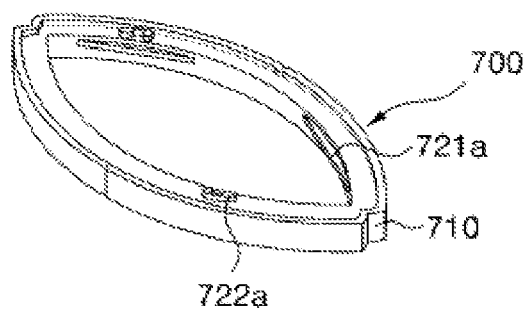
FIG. 14 is a bottom view illustrating a rear surface of a Bluetooth headset 700 according to an embodiment of the inventive concept of FIG. 13.

FIG. 13 is an exploded perspective view illustrating a Bluetooth headset 700 and a wristwatch 800 according to an embodiment of the inventive concept, in which an entire housing 701 of the Bluetooth headset 700 forms an outline part of a display part 811 of the wristwatch. FIG. 14 is a bottom view illustrating a rear surface of a Bluetooth headset 700 according to an embodiment of the inventive concept of FIG. 13. For convenience of description, a difference from the Bluetooth headset 300 and the wristwatch 400 described with reference to FIG. 8 will be mainly described in the following. In the drawing, an embodiment of a method of coupling the Bluetooth headset 700 and the wristwatch 800 of the inventive concept will be described.

Referring to FIGS. 13 and 14, inner coupling steps 721a protrude from an inner surface 701c of a housing 701 of the Bluetooth headset 700 and outer coupling steps 821a protrude from an outline part of the display part 800 at alternate locations of the locations of the inner coupling steps 721a, and if a force is applied from opposite sides to the joint part 710 of the Bluetooth headset 700 in a direction of the arrows, the Bluetooth headset 700 is deformed into a circular ring shape corresponding to the outline part of the watch and the Bluetooth headset 700 is fastened by rotating the Bluetooth headset 700 after fastening the outer coupling steps 821a and the inner coupling steps 721a on the upper surface of the watch body 810. A plurality of stoppers 722a protrudes on a surface of the Bluetooth headset 700 in contact with a seating part 812, and are coupled to stopping protrusions 822a formed in the seating part 812 of the watch body 810 more firmly.

Figure 15:
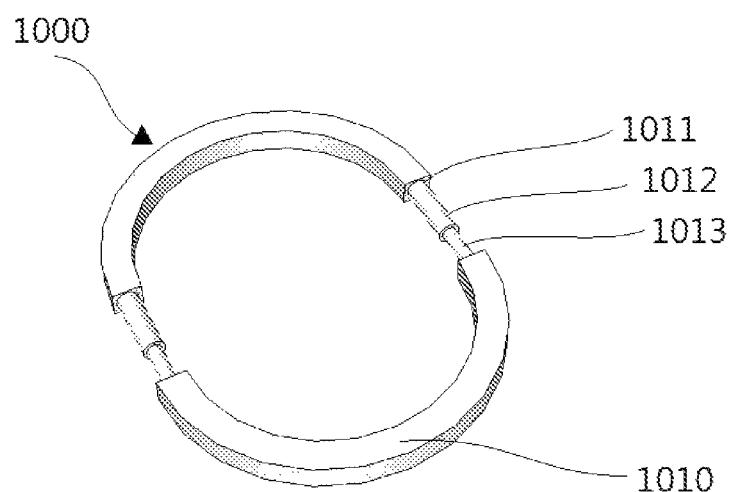
FIG. 15 is an exploded perspective view illustrating that the length of a Bluetooth headset 1000 is adjusted according to an embodiment of the inventive concept.
Figure 16:
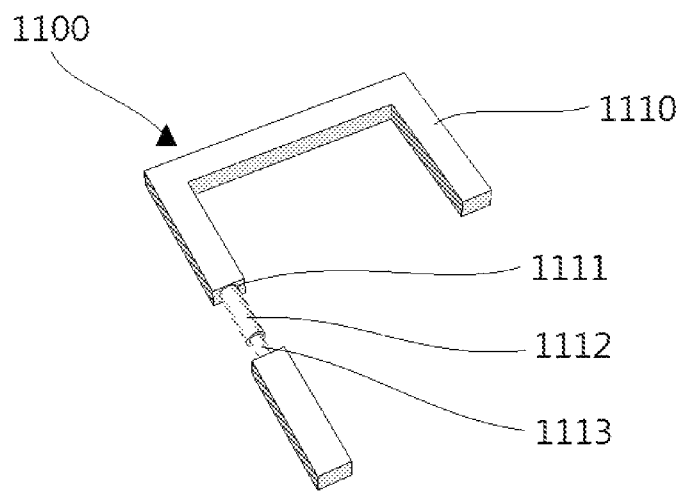
FIG. 16 is an exploded perspective view illustrating that the length of a Bluetooth headset 100 is adjusted while a watch body forms a tetragonal shape according to an embodiment of the inventive concept.

FIG. 15 is an exploded perspective view illustrating that the length of a Bluetooth headset 1000 is adjusted according to an embodiment of the inventive concept. FIG. 16 is an exploded perspective view illustrating that the length of a Bluetooth headset 1100 is adjusted while a watch body forms a tetragonal shape according to an embodiment of the inventive concept. For convenience of description, differences from the aforementioned Bluetooth headsets 100, 300, 500, and 700 will be mainly described in the following.

Referring to FIGS. 15 and 16, the housings 1010 and 1110 of the Bluetooth headset 1000 and 1100 are separated into a plurality of parts, and become close to or spaced apart from each other by a coupler connected to the plurality of parts. The coupler is accommodated inside the housings 1010 and 1110 of the Bluetooth headset 1000 and 1100, and is not exposed normally. The coupler includes sleeves 1012 and 1112 and rods 1013 and 1113. The sleeves 1012 and 1112 are coupled to the rods 1013 and 1113 such that the rods 1013 and 1113 are reciprocally moved. A sleeve accommodating hole 1011 and 1111 is formed at a portion of the housing 1010 and 1110, and the sleeve 1012 and 1112 may be accommodated in the sleeve accommodating hole 1011 and 1111. Through the configuration, the length of the Bluetooth headset 1000 and 1100 may be properly adjusted by pulling the housings 1010 and 1110 of the Bluetooth headset 1000 and 1100 in opposite directions while gripping the housings 1010 and 1110, and the in-use convenience thereof may be further improved if they are provided together with the joint parts 310 and 510 described with reference to FIGS. 9 to 11.

Figure 17:
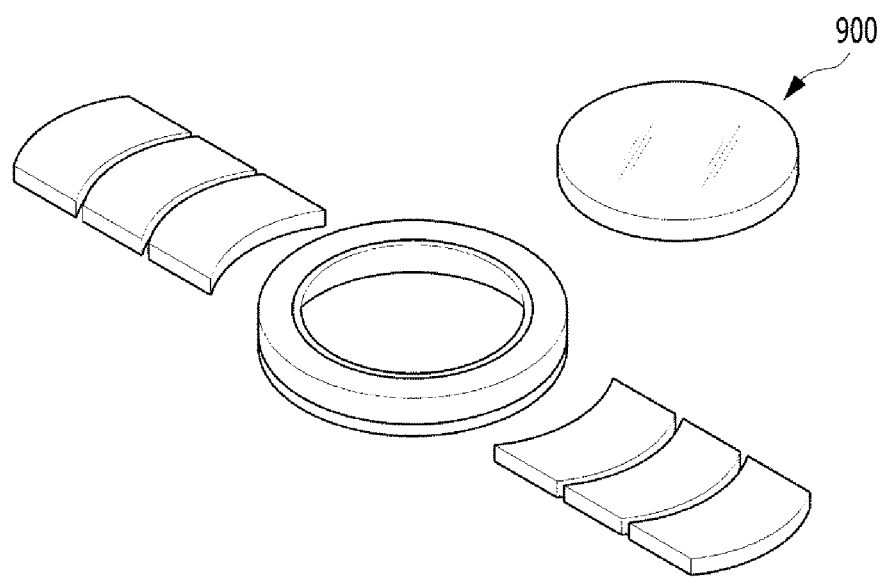
FIG. 17 is an exploded perspective view illustrating that the display part 900 is attached and detached from the wristwatch separately from the Bluetooth headset.

FIG. 17 is an exploded perspective view illustrating that the display part 900 is detached from the wristwatch separately from the Bluetooth headset.

Figure 18:
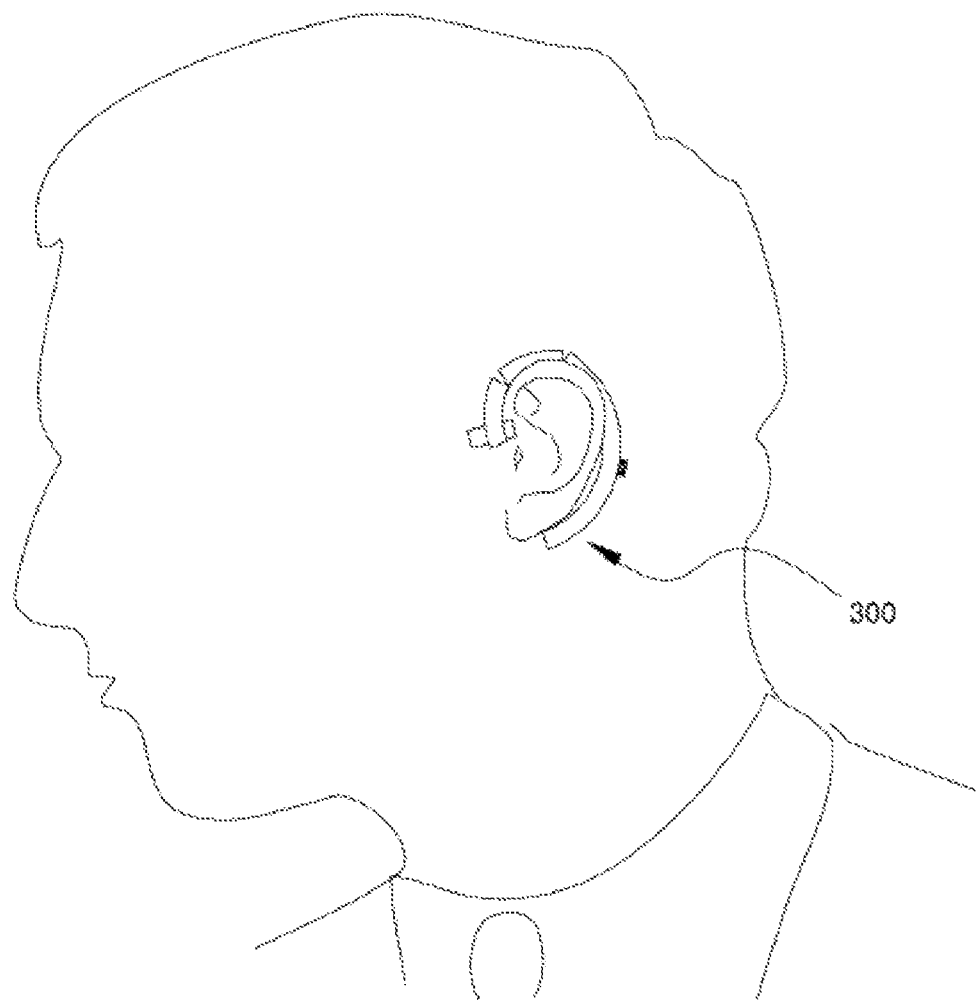
FIG. 18 is an in-use state view illustrating a state in which the Bluetooth headset according to the embodiment of the inventive concept is mounted on an ear of the user.

Finally, FIG. 18 is an in-use state view illustrating a state in which the Bluetooth headset according to the embodiment of the inventive concept is mounted on an ear of the user. It can be seen in FIG. 18 how the Bluetooth headset 300 according to the embodiment of the inventive concept is applied.

Although the embodiments of the inventive concept have been described with reference to the drawings, the inventive concept is not limited thereto. It is understood that the inventive concept may be variously corrected and modified by those skilled in the art without departing from the technical spirit of the inventive concept and the range of equivalents of the claims. Accordingly, the scope of the inventive concept should not be determined by the embodiments and the drawings, but be determined by the claims and the equivalents.

What is claimed is:

1. A wristwatch comprising:
a watch body having a display part on an upper surface thereof and having a seating part at an outline part of the display part; and
a Bluetooth headset comprising a sound output unit that outputs sound information received from a master terminal, having a shape corresponding to an outline part of the display part to surround the display part, seated in the seating part, and installed to be attached to and detached from the watch body, the Bluetooth headset being a slaver terminal of the master terminal that functions as a body case or a bezel of the watch body,
wherein the Bluetooth headset comprises an earring tip that constitutes at least a portion of an upper surface, an inner surface, an outer surface, or a rear surface of a housing of the Bluetooth headset, the earring tip being separable from the housing of the Bluetooth headset to be rotated.

2. A wristwatch comprising:
a watch body having a display part on an upper surface thereof and having a seating part at an outline part of the display part; and
a Bluetooth headset comprising a sound output unit that outputs sound information received from a master terminal, having a shape corresponding to an outline part of the display part to surround the display part, seated in the seating part, and installed to be attached to and detached from the watch body, the Bluetooth headset being a slaver terminal of the master terminal that functions as a body case or a bezel of the watch body,
wherein the Bluetooth headset surrounds only a portion of the display part, and is installed in the watch body to be attached and detached vertically and horizontally.

3. A wristwatch comprising:
a watch body having a display part on an upper surface thereof and having a seating part at an outline part of the display part; and
a Bluetooth headset comprising a sound output unit that outputs sound information received from a master terminal, having a shape corresponding to an outline part of the display part to surround the display part, seated in the seating part, and installed to be attached to and detached from the watch body, the Bluetooth headset being a slaver terminal of the master terminal that functions as a body case or a bezel of the watch body,
wherein the Bluetooth headset comprises a detachment detecting sensor that detects detachment of the Bluetooth headset from the watch body to perform an on/off function of the Bluetooth headset; and a sleep detecting sensor that detects a state in which the Bluetooth headset is separated from the watch body and is not used to perform an off function.

4. A wristwatch comprising:
a watch body having a display part on an upper surface thereof and having a seating part at an outline part of the display part; and
a Bluetooth headset comprising a sound output unit that outputs sound information received from a master terminal, having a shape corresponding to an outline part of the display part to surround the display part, seated in the seating part, and installed to be attached to and detached from the watch body, the Bluetooth headset being a slaver terminal of the master terminal that functions as a body case or a bezel of the watch body,
wherein the Bluetooth headset further comprises a housing that is separated into a plurality of parts, and the plurality of parts of the housing approaches each other or are spaced apart from each other through a coupler.

* * * * *